US010023061B2

(12) United States Patent
Dudar et al.

(10) Patent No.: US 10,023,061 B2
(45) Date of Patent: Jul. 17, 2018

(54) SYSTEM AND METHOD FOR SELECTING CHARGING SOURCE FOR ELECTRIFIED VEHICLE

(71) Applicant: FORD GLOBAL TECHNOLOGIES, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 15/227,609

(22) Filed: Aug. 3, 2016

(65) Prior Publication Data

US 2018/0037127 A1 Feb. 8, 2018

(51) Int. Cl.
H02J 7/00 (2006.01)
B60L 11/18 (2006.01)
B60L 8/00 (2006.01)
H02J 7/35 (2006.01)

(52) U.S. Cl.
CPC ........... *B60L 11/1838* (2013.01); *B60L 8/003* (2013.01); *B60L 8/006* (2013.01); *B60L 11/1842* (2013.01); *H02J 7/355* (2013.01)

(58) Field of Classification Search
CPC ...... B60L 8/003; B60L 8/006; B60L 11/1838; B60L 11/1842
USPC .................. 320/101, 109; 701/22
See application file for complete search history.

(56) References Cited

U.S. PATENT DOCUMENTS

| 3,876,925 | A | 4/1975 | Stoeckert | |
|---|---|---|---|---|
| 2006/0213697 | A1* | 9/2006 | Sutherland | B60K 6/46 180/2.2 |
| 2011/0298841 | A1* | 12/2011 | Fujimori | G09F 9/35 345/690 |
| 2013/0204456 | A1* | 8/2013 | Tippelhofer | B60L 11/1809 701/1 |
| 2014/0297072 | A1 | 10/2014 | Freeman | |

FOREIGN PATENT DOCUMENTS

| CN | 103812140 A | 5/2014 |
|---|---|---|
| CN | 204309615 U | 5/2015 |
| WO | 2013041907 A1 | 3/2013 |

OTHER PUBLICATIONS

Ariel Schwartz, Fast Company Article, Would You Like Some Solar With That? Ford to Sell Panels Along With The Electric Focus, Aug. 10, 2011.
Andrew Liszewski, Gizmodo UK Article, Strap This Wind Turbine to Your Electric Car and You Can Drive Forever, Jan. 8, 2014.

* cited by examiner

*Primary Examiner* — Robert Grant
*Assistant Examiner* — Zixuan Zhou
(74) *Attorney, Agent, or Firm* — Carlson, Gaskey & Olds, P.C.

(57) ABSTRACT

A method according to an exemplary aspect of the present disclosure includes, among other things, charging a battery pack of an electrified vehicle using an amount of harvested energy from an energy harvesting device and an amount of energy from a grid. The amount of harvested energy is predicted based on at least a weather forecast.

10 Claims, 2 Drawing Sheets

SYSTEM AND METHOD FOR SELECTING CHARGING SOURCE FOR ELECTRIFIED VEHICLE

BACKGROUND

This disclosure relates to a system and method for selecting a charging source for an electrified vehicle. In one example, the battery pack of the electrified vehicle is charged by an energy harvesting device, such as a solar panel or a wind turbine.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on internal combustion engines to drive the vehicle.

A high voltage battery pack typically powers the electric machines and other electrical loads of an electrified vehicle. The battery pack includes a plurality of battery cells that must be periodically charged to replenish the energy necessary to power these loads. Some known systems charge the battery pack from an electrical grid. Other known systems charge the battery pack by harvesting energy from environmental sources, such as solar or wind sources.

SUMMARY

A method according to an exemplary aspect of the present disclosure includes, among other things, charging a battery pack of an electrified vehicle using an amount of harvested energy from an energy harvesting device and an amount of energy from a grid. The amount of harvested energy is predicted based on at least a weather forecast.

In a further non-limiting embodiment of the foregoing method, the method includes evaluating the weather forecast while charging the battery pack, and adjusting the respective amounts of harvested energy and energy from the grid contributing to charging the battery pack based on a change in the weather forecast.

In a further non-limiting embodiment of any of the foregoing methods, the method further includes intermittently charging the battery pack from the grid.

In a further non-limiting embodiment of any of the foregoing methods, the method further includes evaluating weather conditions experienced by the electrified vehicle while charging the battery pack, and adjusting the respective amounts of harvested energy and energy from the grid contributing to charging the battery pack based on the weather conditions experienced by the vehicle.

In a further non-limiting embodiment of any of the foregoing methods, the weather conditions are evaluated based on information from at least one sensor mounted to the electrified vehicle.

In a further non-limiting embodiment of any of the foregoing methods, at least one energy harvesting device mounted to the electrified vehicle provides the at least one sensor.

In a further non-limiting embodiment of any of the foregoing methods, the amount of harvested energy is harvested from at least one energy harvesting device mounted to the electrified vehicle.

In a further non-limiting embodiment of any of the foregoing methods, the at least one energy harvesting device includes at least one of a solar panel and a wind turbine.

In a further non-limiting embodiment of any of the foregoing methods, a solar panel and a wind turbine are mounted to the electrified vehicle.

In a further non-limiting embodiment of any of the foregoing methods, the weather forecast is provided by information from a mobile device connected to the electrified vehicle.

A system for an electrified vehicle according to an exemplary aspect of the present disclosure includes, among other things, at least one energy harvesting device, a battery pack selectively charged by the at least one energy harvesting device, and a controller. The controller is configured predict an amount of energy that can be harvested from the at least one energy harvesting device based on a weather forecast. The controller is further configured to charge the battery pack using an amount energy from the at least one energy harvesting device.

In a further non-limiting embodiment of the foregoing system, the controller is configured to evaluate the weather forecast while charging the battery pack, and the controller is configured to adjust the amount of energy from the at least one energy harvesting device based on a change in the weather forecast.

In a further non-limiting embodiment of any of the foregoing systems, the controller is configured to intermittently charge the battery pack from a grid.

In a further non-limiting embodiment of any of the foregoing systems, the controller is configured to evaluate weather conditions experienced by the electrified vehicle while charging the battery pack, and the controller is configured to adjust the amount of energy from the at least one energy harvesting device based on the weather conditions experienced by the vehicle.

In a further non-limiting embodiment of any of the foregoing systems, the system includes at least one sensor. Further, the weather conditions experienced by the electrified vehicle are evaluated based on information from the at least one sensor.

In a further non-limiting embodiment of any of the foregoing systems, the at least one energy harvesting device provides the at least one sensor.

In a further non-limiting embodiment of any of the foregoing systems, the at least one energy harvesting device is mounted to the electrified vehicle.

In a further non-limiting embodiment of any of the foregoing systems, the at least one energy harvesting device includes at least one of a solar panel and a wind turbine.

In a further non-limiting embodiment of any of the foregoing systems, a solar panel and a wind turbine are mounted to the electrified vehicle.

In a further non-limiting embodiment of any of the foregoing systems, the weather forecast is provided by information from a mobile device connected to the electrified vehicle.

DETAILED DESCRIPTION

This disclosure relates to a system and method for an electrified vehicle which includes a controller configured to predict an amount of harvested energy (i.e., energy harvested from environmental conditions) that can contribute to charging a battery pack of the electrified vehicle. Using this prediction, which is based at least in part on a weather forecast, the battery pack of the electrified vehicle can be charged without relying solely on energy drawn from a grid power source. Further, if the predicted amount of harvested energy is not sufficient to charge the battery pack, the battery pack can still be charged in a timely manner by relying on both harvested energy and grid energy.

Figure 1:
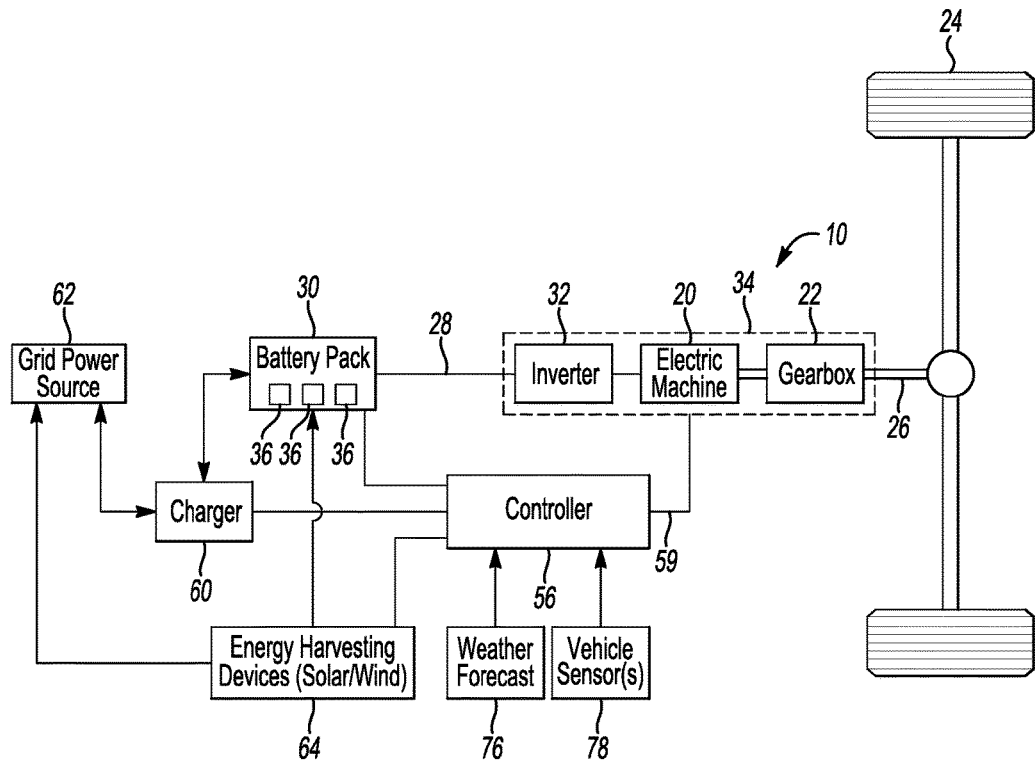
FIG. 1 schematically illustrates a powertrain of an electrified vehicle.
Figure 2:
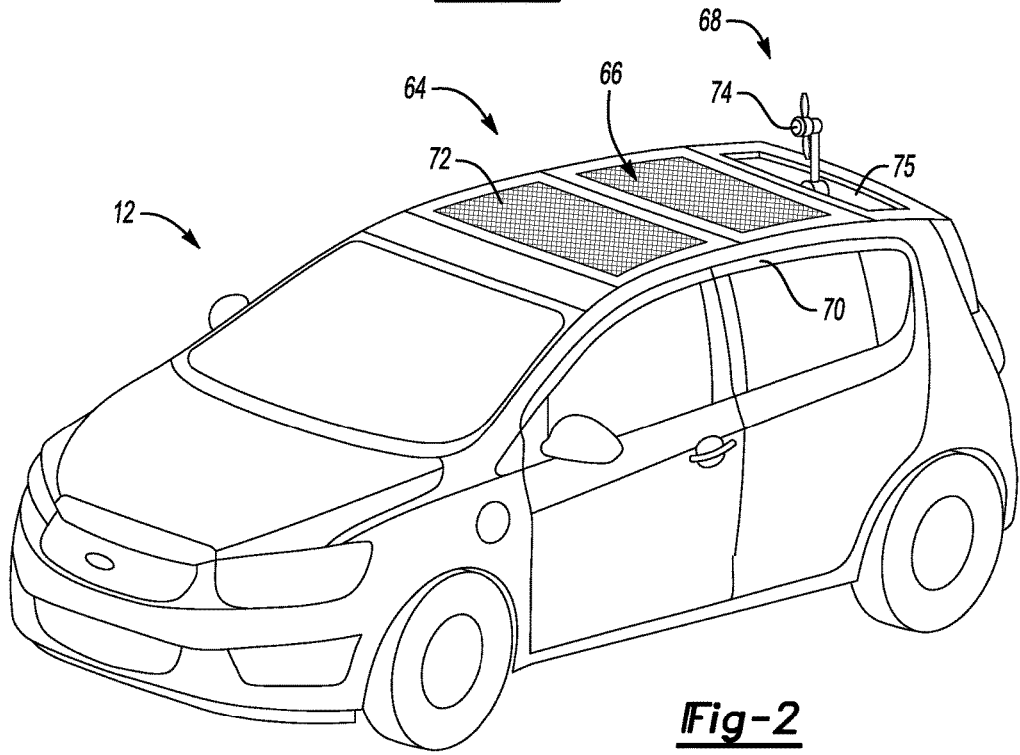
FIG. 2 illustrates an electrified vehicle having energy harvesting devices.

FIG. 1 schematically illustrates a powertrain 10 of an electrified vehicle, such as the electrified vehicle 12 (FIG. 2). Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12.

The powertrain 10 shown in FIG. 1 is highly schematic and is not intended to limit this disclosure. Various additional components could alternatively or additionally be employed by the powertrain 10 within the scope of this disclosure.

In a non-limiting embodiment, the electrified vehicle 12 is a full electric vehicle propelled solely through electric power, such as by an electric machine 20, without any assistance from an internal combustion engine. The electric machine 20 may operate as an electric motor, an electric generator, or both. The electric machine 20 receives electrical power and provides a rotational output power. The electric machine 20 may be connected to a gearbox 22 for adjusting the output torque and speed of the electric machine 20 by a predetermined gear ratio. The gearbox 22 is connected to a set of drive wheels 24 by an output shaft 26. A high voltage bus 28 electrically connects the electric machine 20 to a battery pack 30 through an inverter 32. The electric machine 20, the gearbox 22, and the inverter 32 may collectively be referred to as a transmission 34.

The battery pack 30 is an exemplary electrified vehicle battery. The battery pack 30 may be a high voltage traction battery pack that includes a plurality of battery assemblies 36 (i.e., battery arrays or groupings of battery cells) capable of outputting electrical power to operate the electric machine 20 and/or other electrical loads of the electrified vehicle 12. Other types of energy storage devices and/or output devices can also be used to electrically power the electrified vehicle 12.

The powertrain 10 may additionally include a controller 56 for monitoring and/or controlling various aspects of the powertrain 10 and associated electrified vehicle 12. The controller 56 includes electronics, software, or both, to perform the necessary control functions for operating the electrified vehicle 12.

In one non-limiting embodiment, the controller 56 is a combination vehicle system controller and powertrain control module (VSC/PCM). Although it is shown as a single device, the controller 56 may include multiple controllers in the form of multiple hardware devices, or multiple software controllers within one or more hardware devices. A controller area network (CAN) 59 allows the controller 56 to communicate with the various components of the electrified vehicle 12.

As noted above, the electrified vehicle 12 may be a plug-in hybrid electric vehicle (PHEV) or a battery electric vehicle (BEV). In these examples, the battery pack 30 needs to periodically be charged. In FIG. 1, the battery pack 30 is in communication with a charger 60, which is responsive to instructions from the controller 56 to selectively charge the battery pack 30 from a grid power source 62.

The charger 60 may include a charging port located on-board the electrified vehicle 12 and configured to receive a power cable connected to the grid power source 62, and then distribute the power to the battery pack 30 for charging the battery pack 30. The charger 60 may also be equipped with power electronics used to convert AC power received from the grid power source 62 to DC power for charging the energy storage devices of the battery pack 30. The charger 60 may accommodate one or more conventional voltage sources from the external power supply (e.g., 110 volt, 220 volt, etc.).

In addition to the grid power source 62, the battery pack 30 can also be selectively charged by one or more energy harvesting devices 64. In this disclosure, energy harvesting devices include devices that are configured to harvest energy from environmental conditions, such as the sun or wind, as examples. The controller 56 is configured to selectively distribute power from the energy harvesting devices 64 to charge the battery pack 30.

FIG. 2 illustrates an example electrified vehicle 12, which includes two energy harvesting devices 64. In this example, the example electrified vehicle includes a solar panel 66 and a wind turbine 68. The solar panel 66 is mounted to a roof 70 of the electrified vehicle 12 and includes a plurality of photovoltaic cells 72 configured to convert solar energy into electricity. The example wind turbine 68 includes at least one vaned wheel 74. The example wind turbine 68 is selectively deployed when the electrified vehicle 12 is stopped, and is retracted in a port 75 of the roof 70, for example, when the electrified vehicle 12 is moving. When retracted, the wind turbine 68 is flush with the roof 70, or is below a door that is flush with the roof 70, of the electrified vehicle 12 to reduce drag. In another example, the wind turbine 68 is fixedly mounted to the electrified vehicle, and a duct is selectively opened and closed to direct air to the wind turbine 68. While two example wind turbines are discussed herein, this disclosure extends to other types of wind turbines. The wind turbine 68 is configured to convert kinetic energy from wind into electricity. The electricity harvested by the energy harvesting devices 64 can be used to charge the battery pack 30. Further, while the electrified vehicle 12 in FIG. 2 includes only one wind turbine 68, the electrified vehicle 12 could include additional wind turbines.

This disclosure is not limited to solar and wind energy harvesting devices. Further, while the electrified vehicle 12 includes both a solar panel 66 and a wind turbine 68, this disclosure extends to electrified vehicles that include only one energy harvesting device. This disclosure also extends to electrified vehicles that include three or more energy harvesting devices.

The controller 56 is configured to provide instructions to the various components of the powertrain 10 to selectively charge the battery pack 30 using power from the grid power source 62, the energy harvesting devices 64, or both. In one example, the controller 56 allocates charging duties between the grid power source 62 and the energy harvesting devices 64 based on a predicted amount of energy that can be harvested by the energy harvesting devices 64 over a period of time. In one example, the controller 56 makes this prediction, at least in part, based on a weather forecast.

FIG. 1 schematically illustrates the controller 56 receiving a weather forecast 76. The controller 56 may receive the weather forecast from a user's smartphone, which may be connected to the electrified vehicle 12 via a vehicle infotainment system, for example. Alternatively, a weather forecast 76 may be provided directly to the controller 56 in another known manner, such as by a satellite weather service. For example, the controller 56 may include, or be in communication with, a web-based server. One such example includes Travel Link®, which is a satellite weather service offered by SiriusXM. The weather forecast 64 may also be communicated via a cellular tower or some other known communication technique. In that case, the controller 56 may include a transceiver for bidirectional communication with the cellular tower.

The controller 56 is further in communication with a plurality of sensors 78. The controller 56 uses information from the sensors 78 to determine if the weather conditions predicted by the weather forecast 76 are actually experienced by the electrified vehicle 12. For instance, if the weather forecast 76 indicates that there will be relatively high sun exposure (e.g., low cloud cover and/or a relatively high ultraviolet (UV) index) over a period of time, but the vehicle is parked in a garage, the controller 56 uses information from the sensors 78 to determine that the electrified vehicle 12 is not exposed to the sun despite the weather report. In another example, the weather forecast 76 may indicate that there will be sufficient sun and wind for charging, but the electrified vehicle 12 may be parked under a tree. In that case, the controller 56 would use the information from the sensors 78 to determine that the sun exposure will be limited despite the weather report.

In one example, the sensors 78 are provided by the energy harvesting devices 64 themselves. For instance, the solar panel 66 and the wind turbine 68 harvest energy in proportion to their exposure to sun and wind, respectively. Thus, the controller 56 is configured to determine the weather conditions experienced by the electrified vehicle 12 by the amount of energy being harvested by the solar panel 66 and the wind turbine 68. Other sensors on the electrified vehicle 12 can provide information to the controller 56 indicative of the weather conditions. Further, the electrified vehicle 12 can include additional, dedicated weather sensors used to determine the real-time weather conditions experienced by the electrified vehicle 12.

Figure 3:
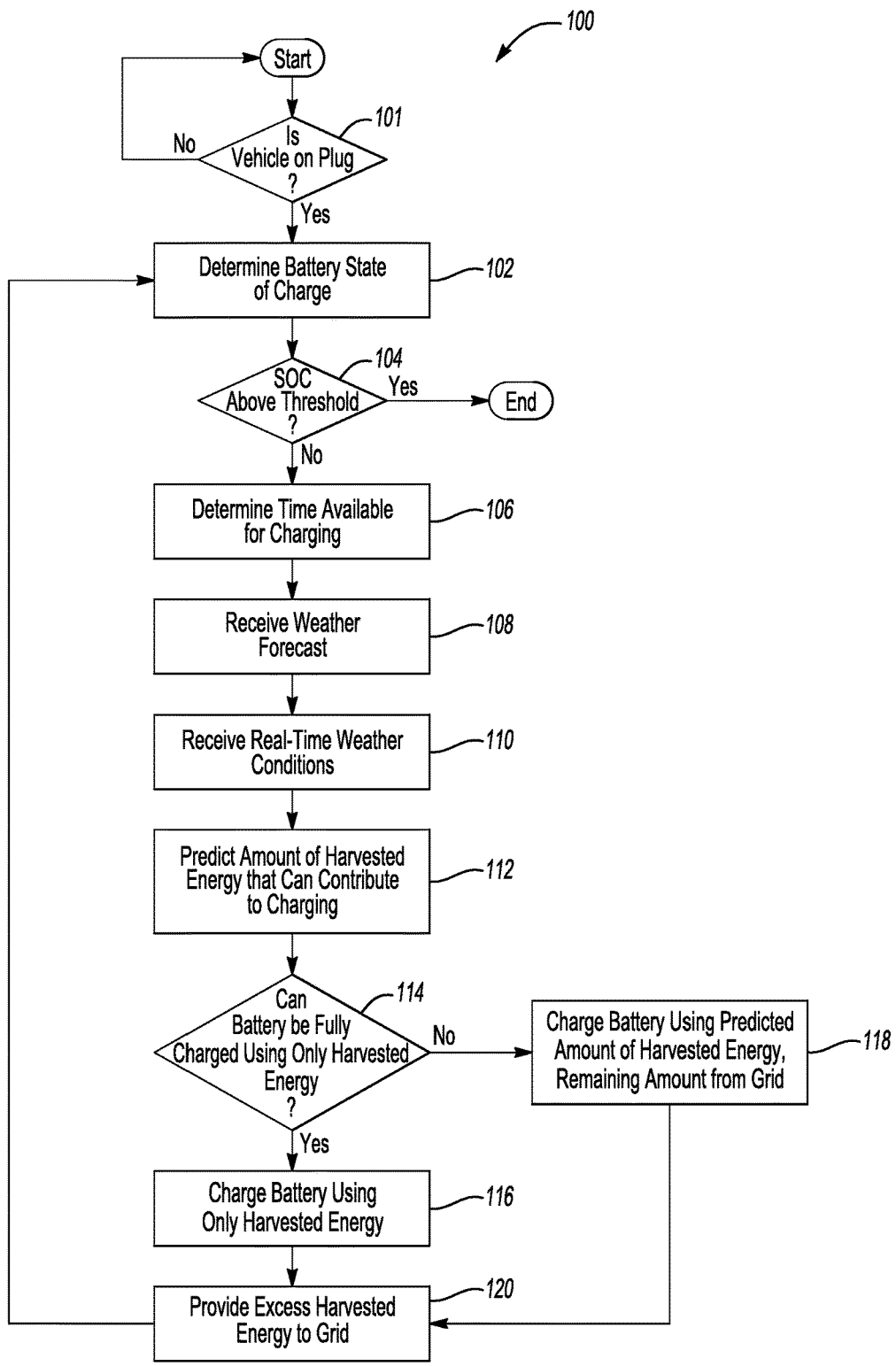
FIG. 3 is a flow chart representative of an example method of this disclosure.

FIG. 3 illustrates an example method 100 in which the controller 56 can select a source for charging the battery pack 30. In particular, using the method 100, the controller 56 can allocate charging duties between the grid power source 62 and the energy harvesting devices 64.

In the method 100, the controller 56 initially determines whether the electrified vehicle is "on plug," at 101. In this disclosure, "on plug" means that the electrified vehicle 12 is plugged-in. In particular, the grid power source 60 is coupled to the battery pack 30 by way of the charger 62. Further, the controller 56 determines the state of charge (SOC) of the battery pack 30, at 102. If the controller determines, at 104, that the state of charge is below a predefined threshold, the controller 56 then determines the time available for charging, at 106.

The controller 56 may determine the time available for charging based on an input from a user. For instance, if the user has parked their car overnight, the user may indicate that a relatively long charging time is permissible. With a longer charging time, the controller 56 has additional opportunities to take advantage of harvested energy, rather than drawing energy from the grid power source 62. On the other hand, if the time available for charging is less than or equal to the time required for the grid, plus any available harvested energy, to fully charge the battery, then the full grid power would be applied for the full time. In other words, the controller 56 may be programmed such that the energy harvesting devices 64 will not be relied upon if doing so would lead to significantly increased charging times.

The controller 56 also receives, at 108, a weather forecast 76. At 110, the controller 56 further receives real-time weather conditions experienced by the electrified vehicle 12 from information from the sensors 78. Next, the controller 56 predicts, at 112, an amount of harvested energy that can contribute to charging the battery pack 30 during the time available for charging. If, for example, the controller 56 determines that there are four (4) hours available for charging, the controller 56 considers the weather forecast over the next four (4) hours. In one example, the prediction is based on the time available for charging, the weather forecast, and the real time weather conditions.

If the weather forecast 76 indicates that there will be low cloud cover and/or a relatively high UV index, for example, and the information from the sensors 78 indicates that the electrified vehicle 12 is sufficiently exposed to the environmental conditions, the controller 56 may initially predict that the battery pack 30 can be fully charged using energy harvested from the energy harvesting devices 64. Further, if the weather forecast 76 indicates that relatively high wind speeds are expected, the controller 56 may reach the same conclusion. In these cases, at 114, the controller 56 determines that the battery pack 14 can be charged using harvested energy, and without relying on the grid power source 62. Thus, at 116, the battery pack 30 is initially charged using only energy harvested from the energy harvesting devices 64.

If, on the other hand, the weather forecast 74 does not indicate that the battery pack 30 can be fully charged using energy from the energy harvesting devices 64, the battery pack 30 is charged, at 118, by allocating a portion of the charging duties to the energy harvesting devices 64 and the remainder of the charging duties to the grid power source 62. If, for example, the controller 56 determines that approximately 40% of the energy required to charge the battery pack 30 can be provided from the energy harvesting devices 64, then 60% is drawn from the grid power source 62 during 118.

In one example, the controller 56 is programmed such that the battery pack 30 is charged by the energy harvesting devices 64 as much as possible, in order to reduce reliance the grid power source 62. Thus, after steps 116 and 118, the controller 56 continually evaluates the allocation of charging duties until the controller 56 determines that the state of charge of the battery pack 30 exceeds the predefined threshold, at 104. Following steps 116 and 118, the method 100 reverts back to step 102 and continually evaluates the state of charge, the time available for charging, the weather forecast, and the real-time weather conditions. The controller 56 is configured to reallocate charging duties, at 114, based on a change in conditions.

In one example, in order to allow the controller 56 to account for real-time changes in weather conditions, for example, the controller 56 is configured to intermittently draw power from the grid power source 62. For instance, if the controller 56 initially determines that the battery pack 30 must be charged by relying on 50% grid power over the charging period, the controller 56 is configured to instruct the charger 60 to turn "on" and "off" at a particular interval, such as every minute. This technique is known as "pulsing", or "duty cycling." By "pulsing" the charger 60, continuously from the beginning of charging as opposed to an alternate method of waiting until the last half of the available charge time, the controller 56 is allowed to continually evaluate the weather forecast and real-time weather conditions to determine whether additional energy can be harvested from the energy harvesting devices 64 in the remaining time available for charging. If the weather conditions change, the controller 56, at 114, can adjust the reliance on grid power faster than the alternate method, by increasing or decreasing the "pulsing" intervals. Also, if the vehicle is unplugged before the expected available charge time is complete, then the controller will have completed more charging than the alternate method.

In some examples, the environmental conditions will allow the energy harvesting devices 64 to harvest more energy than what is required to charge the battery pack 30. In the method 100, if excess energy is harvested by the energy harvesting devices 64 during the charging period, that excess energy can be provided back to the grid power source 62, at 120. Some energy companies offer credits, including money, for doing so.

Using the system and method of the present disclosure, the battery pack of the electrified vehicle can be charged without relying solely on energy drawn from an electrical grid. Further, by allocating charging between the energy harvesting devices and the grid, the battery pack can be charged without significantly increasing charging times even when weather conditions are less than ideal.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
   charging a battery pack of an electrified vehicle using an amount of harvested energy from an energy harvesting device mounted to the electrified vehicle and an amount of energy from a grid, the amount of harvested energy predicted based on at least a weather forecast, wherein the charging step occurs while the vehicle is parked;
   evaluating the weather forecast while charging the battery pack;
   and adjusting the respective amounts of harvested energy and energy from the grid contributing to charging the battery pack based on a change in the weather forecast.

2. The method as recited in claim 1, further comprising: intermittently charging the battery pack from the grid.

3. The method as recited in claim 1, wherein the at least one energy harvesting device includes at least one of a solar panel and a wind turbine.

4. The method as recited in claim 3, wherein a solar panel and a wind turbine are mounted to the electrified vehicle.

5. The method as recited in claim 1, wherein the weather forecast is provided by information from a mobile device connected to the electrified vehicle.

6. A method, comprising, charging a battery pack of an electrified vehicle using an amount of harvested energy from an energy harvesting device mounted to the electrified vehicle and an amount of energy from a grid, the amount of harvested energy predicted based on at least a weather forecast, wherein the charging step occurs while the vehicle is parked;
   evaluating weather conditions experienced by the electrified vehicle while charging the battery pack; and adjusting the respective amounts of harvested energy and energy from the grid contributing to charging the battery pack based on the weather conditions experienced by the vehicle.

7. The method as recited in claim 6, wherein the weather conditions are evaluated based on information from at least one sensor mounted to the electrified vehicle.

8. The method as recited in claim 7, wherein at least one energy harvesting device mounted to the electrified vehicle provides the at least one sensor.

9. A method, comprising: charging a battery pack of an electrified vehicle using an amount of harvested energy from an energy harvesting device mounted to the electrified vehicle and an amount of energy from a grid; and adjusting the respective amounts of harvested energy and energy from the grid contributing to charging the battery pack based on a change in one of (1) a weather forecast and (2) weather conditions experienced by the vehicle.

10. The method as recited in claim 9, wherein the charging step occurs while the vehicle is parked.

* * * * *

UNITED STATES PATENT AND TRADEMARK OFFICE
CERTIFICATE OF CORRECTION

PATENT NO. : 10,023,061 B2  
APPLICATION NO. : 15/227609  
DATED : July 17, 2018  
INVENTOR(S) : Aed M. Dudar, Douglas Raymond Martin and Kenneth James Miller Page 1 of 1

It is certified that error appears in the above-identified patent and that said Letters Patent is hereby corrected as shown below:

In the Claims

In Claim 3, Column 8, Line 11-12; after "wherein the" delete "at least one"

Signed and Sealed this
Twentieth Day of November, 2018

Andrei Iancu
*Director of the United States Patent and Trademark Office*